Sept. 29, 1931. A. JIPP 1,824,999
SYNCHRONIZING DEVICE
Filed Nov. 5, 1926
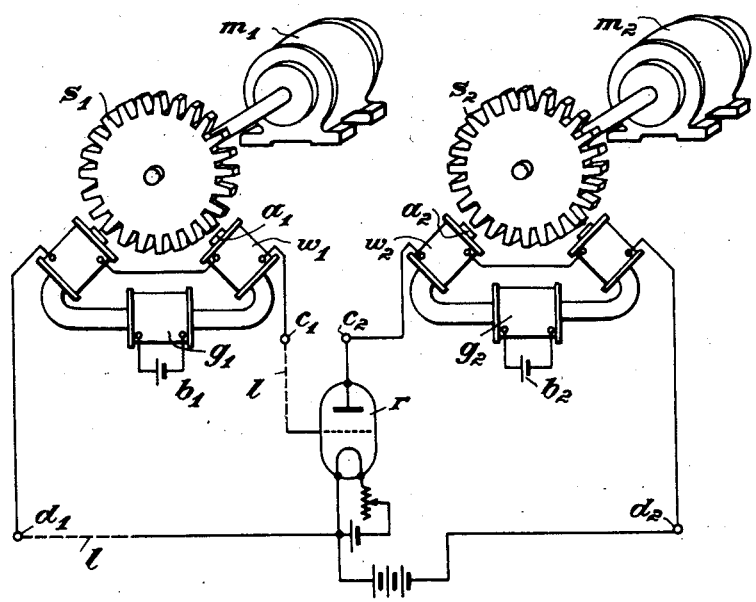
Inventor:
August JIPP
by Lyre, Kellenbach & Farley
Attorneys Patented Sept. 29, 1931

1,824,999

UNITED STATES PATENT OFFICE

AUGUST JIPP, OF BERLIN-SPANDAU, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

SYNCHRONIZING DEVICE

Application filed November 5, 1926, Serial No. 146,345, and in Germany November 6, 1925.

The present invention relates to improvements in synchronizing devices. For many purposes, more particularly the telegraphic transmission of images, there is required a very thorough synchronizing of the image cylinders or the like devices at the transmitting and at the receiving end. The systems first used in printing telegraphs, frequently fail to comply with these high requirements, as the frequency of the synchronizing current, depending on the alternating current pendulum relays or generators, is relatively low. The working of the phonic wheel of La Cour is somewhat better. The higher however the tuning fork frequency chosen, the faultier the contact, and therefore the smaller its controlling energy, so that considerable amplification has to be provided.

This invention relates to a synchronizing device which, as compared to prior systems, has a very high synchronizing frequency (up to 3000–4000 periods an audible frequency) and at the same time has the advantage that it does not influence the whole driving energy of the receiver cylinder, but only equalizes the speed difference of the two cylinders at the transmitter and at the receiver end, which are driven at practically the same speed.

According to the invention, these advantages are obtained by coupling each of the driving motors which are running with approximately the same power and speed, but otherwise independently of each other, at the transmitter and receiver ends, to a mean frequency generator which is constituted, in a manner well known in itself, by an iron disc provided with a large number of teeth, which during its rotation generates an alternating current in a fixed armature winding comprising two or more induction coils. The armature is magnetized by means of a direct current winding. The windings of the two generators, the disc diameters, numbers of teeth and armature winding of which are exactly equal to each other, are connected together by means of a transmission system, e. g. by conductors or by a wireless system. The speed of each of these generators is positively brought into harmony with the speed of the other generator by the alternating current of the latter acting on it. This energy is sufficient to cause the disappearance also of the speed difference of the two driving motors up to a certain limit.

When using long conductors or lines causing considerable losses, or in the case of the use of wireless transmission when the alternating current of the generators is utilized for the modulation of a high frequency carrier wave, the alternating currents transmitted will no longer possess the energy required for the synchronization of speed equalization. This drawback can be easily remedied by means of an amplifier, such as for instance an amplifier valve, arranged in the line or in the transmitter or receiver. It is true that there still will take place then an influencing only in the direction, grid circuit—anode circuit, that is to say the generator connected to the grid circuit will be able to "drive" the other very well in time, but not conversely. It is however possible even in this case to obtain a perfect equality of the mutual influencing by using a two-way transmission system, that is to say, a system comprising two portions or circuits, one for transmission in one direction and the other for transmission in the other direction, each of said portions including one or more amplifiers.

The drawing shows by way of example a construction according to the invention. $m1$, $m2$ are the driving motors belonging to the image cylinders or the like, at the transmitter and receiver ends respectively, and connected rigidly to the toothed iron discs $s1$, $s2$ respectively which are of the same size. These disks, which form part of electric current generators, also have the same number of teeth (twenty-four in the example illustrated). $a1$ and $a2$ are the corresponding fixed armatures, on the cores of which are arranged the windings $w1$ or $w2$ respectively as well as the direct current preliminary magnetization windings $g1$ or $g2$ respectively which are fed with current from the battery $b1$ or $b2$ respectively. Between the terminals $c1$ and $c2$ of the armature windings on one hand and their other terminals $d1$ and $d2$ on the other hand, are arranged the line $l$ and the amplifier $r$, the action of which is such that the motor $m2$ easily adapts itself even to relatively strong fluctuations in the speed of the motor $m1$. The generators are so constructed as to produce currents of relatively high frequency, in accordance with the statements made in the introductory paragraphs of this specification. Preferably, as illustrated, the spacing of the teeth on the generator discs $s_1$, $s_2$ is much closer than that of the poles of the same pair of fixed armatures $a_1$ or $a_2$ respectively; in the drawing, the space between the two fixed poles $a_1$ (or $a_2$) is equal to six tooth divisions of the generator discs $s_1$, $s_2$. Currents of relatively high frequency are thus produced. When I say that the space between the two fixed poles $a_1$ (or $a_2$) is equal to six tooth divisions of the associated generator disk $s_1$ (or $s_2$ respectively), I mean to measure such space angularly or circumferentially, in the arc of a circle whose center is on the axis of the respective generator disk; in other words, the angle formed by two radii drawn from the axis of the generator disk to the centers of the two fixed poles of the same pair, is just six times as large as the angle formed by two radii drawn from the same axis to the central points of two adjoining teeth of the respective generator disk. When employing a relative arrangement in which the angular spacing of the two poles of the same pair is an exact multiple of the spacing of adjoining teeth, I obtain maximum electromotive forces. The variation of the magnetic flux will produce in the windings or coils $w_1$ and $w_2$ potentials which are directly proportional to such variation. With constant force energizing, these variations are directly proportional to the magnetic resistance of the circuit. If the angular spacing of the two poles is an exact multiple of the tooth spacing, two teeth will come simultaneously into registry with the poles of the same pair, and at such moments the magnetic resistance will be a minimum; again, at other points of the revolution two tooth spaces of the same disk will come into registry simultaneously with the poles of the same pair, and at such moments the magnetic resistance will attain its maximum. Thus with the same energizing and under otherwise similar conditions, I obtain the greatest possible fluctuations of the magnetic resistance and consequently the maximum potentials. The connection shown is of course only one of the many possible constructions. In the same way for instance several valves could be used in cascade connection; further, for the purpose of securing a better response or speed adjustment, I might provide a transformer of proper character, or like apparatus, on the armature winding of the generators, in the grid circuit, or in the anode circuit.—By constructing and operating the generators in such a manner that the currents produced by them will have an audible frequency, I secure the important advantage that the ordinary telephone lines can be used for the transmission of the synchronizing currents, so that no special lines will have to be constructed.

What I claim is:

1. A synchronizing device comprising a motor at the transmitting station, another motor at the receiving station, both of said motors being adapted to run at approximately the same speed, a generator driven by the first-mentioned motor, another generator driven by the second motor, the currents produced by each of said generators having a relatively high frequency, of about the order of up to three thousand to four thousand cycles, said first-mentioned generator including a rotatable iron disk provided with a toothed edge and stationary armatures constituted by coils and iron cores, said second generator likewise including a rotatable iron disk having a toothed edge and fixed armatures constituted by coils and iron cores, and a transmission system connecting the coils of said generators with each other.

2. A synchronizing device comprising a motor at the transmitting station, another motor at the receiving station, both of said motors being adapted to run at approximately the same speed, a synchronous generator driven by the first-named motor and producing electric impulses of relatively high frequency, of about the order of up to three thousand to four thousand cycles, another synchronous generator driven by the other motor and producing electric impulses of the same frequency as the first-named generator, and a transmission system by which the impulses are transmitted from one of said generators to the other.

3. A synchronizing device comprising a motor at the transmitting station, another motor at the receiving station, both of said motors being adapted to run at approximately the same speed, a synchronous generator driven by the first-named motor and producing electric impulses of relatively high frequency, of about the order of up to three thousand to four thousand cycles, another synchronous generator driven by the other motor and producing electric impulses of the same frequency as the first-named generator, and a transmission system by which the impulses are transmitted from one of said generators to the other, said transmission system including an amplifying device which is operative for transmission in one direction only.

In testimony whereof I affix my signature.

AUGUST JIPP.